Patented Oct. 17, 1933

1,931,220

UNITED STATES PATENT OFFICE 1,931,220

TREATMENT OF ZINC OXIDE RESIDUES

Robert V. Brown and Robert O. Wood, Hamburg, N. Y., assignors to National Aniline & Chemical Company, Inc., New York, N. Y., a corporation of New York No Drawing. Application September 6, 1929
Serial No. 390,850

20 Claims. (Cl. 23—125)

This invention relates to the treatment of residues containing zinc oxide and resulting from the reduction of organic compounds with zinc and caustic alkali as the reducing agent.

In the reduction, for example, of nitrobenzene with zinc dust and alkali for the production of hydrazobenzene, the zinc oxide residue produced in such reduction, as isolated from the hydrazobenzene, is contaminated with organic matter, alkali and other impurities which render it unsuitable for use in the manufacture of zinc sulfate to be used in making lithopone. The organic residues present in the zinc oxide may be hydrazobenzene azoxybenzene, azobenzene, aniline and unreduced nitrobenzene. There may also be a certain amount of zinc which has not been converted into the oxide by the reduction. Zinc sulfate made from this contaminated zinc oxide by-product without removal of the organic constituents therefrom has a brownish color which renders it undesirable for the manufacture of lithopone. In order to eliminate the organic constituents from such residues it has been the practice in some instances to incinerate the zinc oxide residue before converting the oxide into the sulfate. However, the incineration process results in the destruction of the organic materials so that they cannot be recovered and subsequently used and the process itself is expensive.

It is an object of the present invention to recover the zinc contained in such residues in the form of zinc sulfate suitable for use in the production of lithopone.

Another object of the invention is to separate and recover organic substances present in a zinc oxide residue produced by the reduction of organic nitro bodies with metallic zinc and alkali.

A further object of the invention is to reduce the cost of reduction of organic nitro bodies with metallic zinc by utilizing the zinc oxide residue produced for the recovery of organic substances contained in such residue and then reducing the organic substances so recovered.

Other objects of the invention will in part be obvious and will in part appear hereinafter.

The invention accordingly comprises the several steps and the relation of one or more of such steps with respect to each of the others thereof, which will be exemplified in the process hereinafter disclosed, and the scope of the invention will be indicated in the claims.

The zinc oxide residue resulting from the production of hydrazobenzene, hydrazotoluene, hydrazoanisidine and other caustic alkali reductions containing the organic impurities, and in some instances zinc dust, is treated with sulfuric acid to produce a solution containing zinc sulfate. The zinc sulfate appears to act as a salting-out agent to prevent the dissolving of the organic matter to any great extent. The insoluble organic matter may be separated at this point in any convenient manner, as by filtration from the zinc sulfate solution, and the organic matter recovered is preferably subjected to a further reducing action. Preferably the organic matter which remains dissolved in the solution is precipitated by the addition of an aldehyde, preferably an aliphatic aldehyde, such as, formaldehyde or acetaldehyde, although an aromatic aldehyde such as benzaldehyde may also be employed. The insoluble matter consisting of the aldehyde reaction product of the organic material contained in the zinc sulfate solution is isolated in any convenient manner, for example by filtration, and the resulting solution containing zinc sulfate may be concentrated to produce zinc sulfate in the hydrous or anhydrous state.

The organic matter present in the zinc oxide residues produced by the reduction of nitro bodies with zinc and caustic alkali, probably consists of a small portion of unreduced nitro body and amino body, some of the corresponding hydroazo body, and products of reduction intermediate between the nitro and the hydroazo bodies. Because of the high temperature which results when the residue is dissolved in sulfuric acid, some of the organic matter is volatilized; some is more or less charred; and the remaining insoluble organic matter can be removed in any suitable manner, e. g., by filtration. The small quantity of organic matter remaining in solution is rendered insoluble by the addition of the aldehyde to the solution. While the foregoing is believed to be a logical explanation of the theory under the present invention, it is not intended that the invention should be limited thereby or thereto in any respect.

If desired, the step of filtration before adding the aldehyde to the zinc sulfate solution may be omitted, and after addition of the aldehyde to the solution the insoluble matter may be filtered off and treated to recover valuable organic products therefrom.

The composition of the zinc oxide residues varies, depending on the particular conditions under which they were produced. It is therefore obviously impossible to specify herein the precise proportion of reagents to be used which would be most successful and economical in each case.

As an illustrative embodiment of a manner in which the invention may be practiced, the following example is presented. The parts are by weight.

*Example.*—500 parts of a zinc-oxide containing residue, obtained in the reduction of nitrobenzene with zinc and caustic alkali for the production of hydrazobenzene, are admixed with 800 parts water. To the admixture is added concentrated sulfuric acid (66° Bé.) with good agitation until the mixture remains slightly acid. The zinc content, such as free zinc and zinc oxide, are thus dissolved with considerable evolution of heat. A portion of organic compounds together with the partly charred matter, remain undissolved and float on the surface of the reaction mass.

The mixture is neutralized with finely divided zinc oxide, about 5 parts in excess being added as an aid to filtration. One part of a 37% solution of formaldehyde is now added, and the mixture is filtered to remove insoluble matter consisting of organic matter and the excess zinc oxide. The filtrate may then be concentrated by evaporation to produce zinc sulfate containing, for example, about 3½ mols of water.

The above example is given by way of illustration, and it will be understood therefore that the invention is not limited to the details given therein. The process is capable of numerous modifications within the scope of the invention. Thus, the insoluble matter may be filtered off before the addition of the formaldehyde, if desired, and subjected to a reducing action. In a modified procedure the admixture of zinc oxide residue and water may be treated with an aldehyde before the treatment with sulfuric acid to dissolve the zinc oxide. However, it is preferable to add the aldehyde to a neutral or slightly alkaline solution of zinc sulfate, although in some instances the aldehyde may be added advantageously to an acid solution of zinc sulfate.

In order to insure the dissolving of the zinc oxide residue, it is desirable to add sufficient sulfuric acid to the admixture to maintain the solution acid when all of the zinc oxide has been dissolved. However, the acid may be added slowly or in lesser quantities, if desired. Where an excess of sulfuric acid has been used to treat the zinc oxide residues, the solution may be neutralized with zinc oxide or with additional zinc oxide residue. The addition of an excess of zinc oxide to the solution is sometimes preferable since the zinc oxide aids in the filtering of the solution. However, other filtering aids, for example "Filter-Cel" may be used or the filtration may be performed without a filtering aid. Excellent results have been obtained by dissolving all but a small portion of the zinc oxide residue with the sulfuric acid and adding the aldehyde to the resulting mixture. The undissolved zinc oxide residue then serves the double function of preventing acidity of the solution and serving as an aid to filtration.

Since certain changes may be made in carrying out the above process without departing from the scope of the invention, it is intended that all matter contained in the above description shall be interpreted as illustrative and not in a limiting sense.

We claim:

1. A process for the treatment of zinc oxide residues, which comprises treating a zinc oxide residue containing reduction products of nitro bodies with sulfuric acid producing thereby zinc sulfate in solution, adding to said solution an agent capable of reacting with organic material therein to form an insoluble reaction product, separating insoluble matter from the zinc sulfate solution, and evaporating the zinc sulfate solution.

2. A process for the treatment of zinc oxide residues, which comprises treating a zinc oxide residue containing reduction products of nitro bodies with sulfuric acid, adding an aldehyde to the zinc sulfate solution so produced to precipitate organic impurities, and isolating insoluble matter.

3. A process for the treatment of zinc oxide residues, which comprises treating a zinc oxide residue containing reduction products of nitro bodies with sulfuric acid, adding an aliphatic aldehyde to the zinc sulfate solution so produced to precipitate organic impurities, and isolating insoluble matter.

4. A process for the treatment of zinc oxide residues, which comprises treating an insoluble zinc oxide residue, obtained in the reduction of organic nitro compounds with zinc and alkali, with sulfuric acid, producing thereby a solution of zinc sulfate, adding an aldehyde to the resulting zinc solution to precipitate organic impurities out of solution, filtering off insoluble matter, and evaporating the filtrate.

5. A process for the treatment of zinc oxide residues, which comprises treating an insoluble zinc oxide residue, obtained in the reduction of an organic nitro compound with zinc and alkali, with sulfuric acid whereby a solution of zinc sulfate is produced, adding an aliphatic aldehyde to the resulting zinc sulfate solution to precipitate organic impurities out of such solution, filtering off insoluble matter and evaporating the filtrate.

6. A process for the treatment of zinc oxide residues, which comprises treating a zinc oxide residue containing reduction products of nitro bodies with sulfuric acid, neutralizing the resulting solution by addition thereto of zinc oxide, adding an aldehyde to the solution to precipitate organic bodies, and isolating the organic bodies.

7. A process for the treatment of zinc oxide residues, which comprises treating a zinc oxide residue containing reduction products of nitro bodies with sulfuric acid, neutralizing the resulting solution by addition thereto of finely divided zinc oxide in excess, adding an aldehyde to the solution to precipitate organic bodies, and isolating the organic bodies.

8. A process for the treatment of zinc oxide residues, which comprises treating a zinc oxide residue containing reduction products of nitro bodies with sulfuric acid, neutralizing the resulting solution by addition thereto of finely divided zinc oxide in excess, adding an aliphatic aldehyde to the solution to precipitate organic bodies, and isolating the organic bodies.

9. The process which comprises treating an insoluble zinc oxide residue containing reduction products of nitro bodies with sulfuric acid, adding an aldehyde to the solution so produced to render insoluble organic matter contained therein, separating the insoluble matter and separating zinc sulfate from the mother liquor.

10. The process which comprises treating an insoluble zinc oxide residue containing reduction products of nitro bodies with sulfuric acid, adding an aliphatic aldehyde to the solution so produced to render insoluble organic matter contained therein, separating the insoluble matter and separating zinc sulfate from the mother liquor.

11. The process which comprises treating an insoluble zinc oxide residue containing reduction products of nitro bodies with sulfuric acid, and adding an aldehyde to the solution so produced whereby organic matter contained therein is rendered insoluble.

12. The process which comprises treating an insoluble zinc oxide residue containing reduction products of nitro compounds with sulfuric acid, and adding an aliphatic aldehyde to the solution so produced whereby organic matter contained therein is rendered insoluble.

13. The process which comprises treating an insoluble zinc oxide residue containing reduction products of nitro bodies with sulfuric acid, separating insoluble organic matter, and subjecting said organic matter to the reducing action of zinc and caustic alkali.

14. A process for treating zinc oxide residues obtained in the reduction of organic nitro compounds, which comprises separating organic matter from the zinc oxide in the residue, and subjecting said organic matter to a reducing action.

15. A process for treating zinc oxide residues obtained in the reduction of organic nitro compounds, which comprises dissolving the zinc oxide content of said residue, removing the organic matter by filtration, and subjecting such organic matter to a reducing action.

16. A process for treating zinc oxide residues obtained in the reduction of organic nitro compounds, which comprises dissolving the zinc oxide content of said residue, precipitating organic matter from the solution so produced, and separating the precipitated organic matter from such solution.

17. A process for treating zinc oxide residues obtained in the reduction of organic nitro compounds, which comprises dissolving the zinc oxide content of said residue, precipitating organic matter from the solution so produced, separating the precipitated organic matter from such solution, and subjecting the organic matter to a reducing action.

18. A process for the treatment of zinc oxide resides, which comprises converting the zinc oxide content thereof into a soluble salt, and rendering the organic matter contained therein insoluble.

19. A process for the treatment of zinc oxide residues, which comprises converting the zinc oxide content thereof into a soluble salt, and rendering the organic matter contained therein insoluble by the addition of an aldehyde.

20. A process for the treatment of zinc oxide residues, which comprises converting the zinc oxide content thereof into zinc sulfate, and rendering the organic matter contained therein insoluble by the addition of an aliphatic aldehyde.

ROBERT V. BROWN.
ROBERT O. WOOD.